United States Patent
Saito et al.

(10) Patent No.: US 6,361,069 B1
(45) Date of Patent: Mar. 26, 2002

(54) HEAD-PROTECTION AIR-BAG DEVICE

(75) Inventors: Etsuji Saito, Nisshin; Minoru Chida, Toyota; Hiroshi Hasegawa, Owariasahi; Katsuya Shimazu, Toyota, all of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/727,704

(22) Filed: Dec. 4, 2000

(51) Int. Cl.⁷ ................................................ B60R 21/22
(52) U.S. Cl. ................. 280/730.2; 280/749; 280/801.1; 280/801.2; 280/808
(58) Field of Search ......................... 280/730.2, 730.1, 280/749, 801.1, 801.2, 808; 296/39.1

(56) References Cited

U.S. PATENT DOCUMENTS

| | | | |
|---|---|---|---|
| 4,465,303 A | * | 8/1984 | Miki et al. ................. 280/804 |
| 5,265,903 A | | 11/1993 | Kuretake et al. |
| 5,730,463 A | | 3/1998 | Fisher et al. |
| 5,755,457 A | | 5/1998 | Specht |
| 5,788,270 A | | 8/1998 | Haland et al. |
| 5,791,683 A | | 8/1998 | Shibata et al. |
| 5,884,937 A | | 3/1999 | Yamada |
| 5,924,723 A | | 7/1999 | Brantman et al. |
| 5,957,487 A | * | 9/1999 | Stutz ....................... 280/730.2 |
| 6,073,961 A | | 6/2000 | Bailey et al. |
| 6,082,761 A | | 7/2000 | Kato et al. |
| 6,095,551 A | | 8/2000 | O'Docherty |
| 6,176,513 B1 | * | 1/2001 | Neidert ...................... 280/729 |

FOREIGN PATENT DOCUMENTS

JP    11-91489    4/1999

\* cited by examiner

*Primary Examiner*—Eric Culbreth
(74) *Attorney, Agent, or Firm*—Oliff & Berridge, PLC

(57) ABSTRACT

A head-protection air-bag device includes a head-protection air-bag body that can be mounted in a folded state along a roof side rail, and is deployed like a curtain so as to cover at least a center pillar from the inside of a vehicle compartment. A deployment-direction regulator (e.g., a projecting portion of a center-pillar garnish) that regulates the deployment direction of the head-protection air-bag body toward the inside of the vehicle compartment is provided at a position above and adjacent to an interior projection of the vehicle compartment such as a slip joint at the center pillar. Alternatively, or in addition to the deployment-direction regulator, a lower end of a portion of the air-bag body that covers the center pillar can be shaped so as not to project downward from an inflation chamber, and/or can be provided with a longitudinal inflation chamber at its lower end that inflates during an early stage of inflation and deployment to prevent that portion of the air-bag body from catching on the interior projection of the vehicle compartment.

10 Claims, 12 Drawing Sheets

HEAD-PROTECTION AIR-BAG DEVICE

BACKGROUND OF THE INVENTION

1. Field of the Invention

The invention relates to a head-protection air-bag device mounted in vehicles.

2. Description of Related Art

One type of head-protection air-bag device is shown in, e.g., Japanese Laid-Open Publication No. 11-91489, in which a head-protection air-bag body, which is deployed like a curtain so as to cover at least the center pillar from the inside of the vehicle compartment, is mounted in a folded state along the roof side rail.

In the head-protection air-bag device of the above-mentioned publication, the head-protection air-bag body has a plurality of vertically extending inflation chambers that receive a gas from the above. Accordingly, if deployment is started in the state where the lower end of a corresponding portion of the head-protection air-bag body, i.e., the lower end of a portion that covers the center pillar upon inflation and deployment of the head-protection air-bag body, is not sufficiently inflated, the lower end of the corresponding portion may become hooked at an interior projection of the vehicle compartment such as a slip joint at the center pillar. This may hinder the deployment of the head-protection air-bag body. For example, the lower end of a portion that covers the center pillar upon inflation and deployment of the head-protection air-bag body may intrude in a gap that exists at a root of the slip joint, that is a narrow gap formed between the slip joint and a surface of the center pillar, and then the portion become hooked at the slip joint. This also may hinder the deployment of the head-protection air-bag body.

SUMMARY OF THE INVENTION

According to a first aspect of the invention, a head-protection air-bag device includes a head-protection air-bag body that can be mounted in a folded state along a roof side rail, and deployed like a curtain so as to cover at least a center pillar from an inside of a vehicle compartment. This head-protection air-bag device includes a deployment-direction regulator that regulates a deployment direction of the head-protection air-bag body toward the inside of the vehicle compartment. The deployment-direction regulator is provided at a position above and adjacent to an interior projection of the vehicle compartment such as a slip joint at the center pillar.

The deployment-direction regulator may be a projecting portion provided integral with a center-pillar garnish and may be substantially triangular in vertical cross section. Alternatively, the deployment-direction regulator may be a projecting portion provided integral with a getting-on/off assist grip and may be substantially triangular in vertical cross section. The getting-on/off assist grip is fixedly attached to an upper end of the center pillar. Alternatively, the deployment-direction regulator may be a projecting portion provided integral with a slide plate and may be substantially triangular in vertical cross section. The slide plate is mounted to an adjustable anchor that is vertically adjustable in position while supporting the slip joint.

In the head-protection air-bag body according to the first aspect of the invention, even if deployment is started in the state where a lower end of a corresponding portion of the head-protection air-bag body, i.e., a lower end of a portion that covers the center pillar upon inflation and deployment of the head-protective air-bag body, is not sufficiently inflated, the deployment-direction regulator provided at the position above and adjacent to the interior projection such as the slip joint at the center pillar guides the lower end while regulating the deployment direction thereof toward the inside of the vehicle compartment. Accordingly, the lower end of the corresponding portion of the head-protection air-bag body can be effectively prevented from being hooked at the interior projection of the vehicle compartment.

As described above, the deployment-direction regulator of the above-mentioned aspect may be substantially triangular in vertical cross section, and may be either one of a projecting portion provided integral with the center-pillar garnish, a projecting portion provided integral with the getting-on/off assist grip, and a projecting portion provided integral with the slide plate. Each of the above-mentioned projecting portions guides the lower end of the corresponding portion of the air-bag body while regulating the deployment direction thereof toward the inside of the vehicle compartment. Accordingly, the lower end of the corresponding portion of the head-protection air-bag body can be effectively prevented from being hooked at the interior projection of the vehicle compartment. Moreover, the respective projecting portion need only be added to the center-pillar garnish, the getting-on/off assist grip or the slide plate. Such a simple structure allows the invention to be embodied at low cost. In the case of using the projecting portion provided in the slide plate, even when the slip joint is vertically adjusted in position, the slide plate is moved together therewith, so that the slip joint and the projecting portion are always kept in a fixed positional relation. Therefore, the lower end of the corresponding portion of the head-protection air-bag body can always be stably prevented from being hooked at the interior projection of the vehicle compartment.

According to a second aspect of the invention, a head-protection air-bag device includes a head-protection air-bag body that can be mounted in a folded state along a roof side rail, and deployed like a curtain so as to cover at least a center pillar from an inside of a vehicle compartment. A lower end of a corresponding portion of the head-protection air-bag body, i.e., a lower end of a portion that covers the center pillar upon inflation and deployment of the head-protection air-bag body, is shaped so as not to project downward from an inflation chamber.

Such a non-projecting shape may be formed by providing a non-inflatable extended portion at an end of the corresponding portion of the head-protection air-bag body, and folding back the extended portion upward toward an outside of the vehicle compartment and fixing the extended portion to the head-protection air-bag body or to the roof side rail. Alternatively, the non-projecting shape may be formed by folding the end of the corresponding portion of the head-protection air-bag body into the inflation chamber such that the folded portion projects into the inflation chamber.

In the head-protection air-bag body according to the second aspect of the invention, the lower end of the corresponding portion of the head-protection air-bag body does not project downward from the inflation chamber. Therefore, even if deployment is started in the state where the lower end of the corresponding portion that covers the center pillar upon inflation and deployment of the head-protection air-bag body is not sufficiently inflated, the lower end of the corresponding portion is not likely to be hooked at an interior projection of the vehicle compartment due to the non-projecting shape. Accordingly, the lower end of the corresponding portion of the head-protection air-bag body can be effectively prevented from being hooked at the interior projection of the vehicle compartment.

In the case where the non-projecting shape is formed by providing the non-inflatable extended portion at the end of the corresponding portion of the head-protection air-bag body, and folding back the extended portion upward toward the outside of the vehicle compartment and fixing the extended portion to the head-protection air-bag body or to the roof side rail, the non-inflatable extended portion can protectively cover and reinforce the corresponding portion (in which inflation chambers are usually formed) of the head-protection air-bag body from the outside of the vehicle compartment. As a result, the corresponding portion can be effectively prevented from being damaged from the outside of the vehicle compartment (e.g., the damage caused by the window glass).

According to a third aspect of the invention, a head-protection air-bag device includes a head-protection air-bag body that can be mounted in a folded state along a roof side rail, and deployed like a curtain so as to cover at least a center pillar from an inside of a vehicle compartment. The head-protection air-bag device includes a longitudinal inflation chamber provided in a lower end of a corresponding portion of the head-protection air-bag body, i.e., in a lower end of a portion that covers the center pillar upon inflation and deployment of the head-protection air-bag body, and that is inflated in an early stage of inflation and deployment.

In the head-protection air-bag body according to the third aspect of the invention, even if deployment is started in the state where the lower end of the corresponding portion that covers the center pillar upon inflation and deployment of the head-protection air-bag body is not sufficiently inflated, the longitudinal inflation chamber is inflated in the early stage of the inflation and deployment. As a result, the lower end of the corresponding portion of the head-protection air-bag body is not likely to be hooked at an interior projection of the vehicle compartment. Therefore, the lower end of the corresponding portion of the head-protection air-bag body can be effectively prevented from being hooked at the interior projection of the vehicle compartment.

BRIEF DESCRIPTION OF THE DRAWINGS

The foregoing and other objects, aspects, features and advantages of the invention will become apparent from the following description of preferred embodiments with reference to the accompanying drawings in which like reference numerals designate like elements and wherein.

DETAILED DESCRIPTION OF THE PREFERRED EMBODIMENTS

Figure 1:
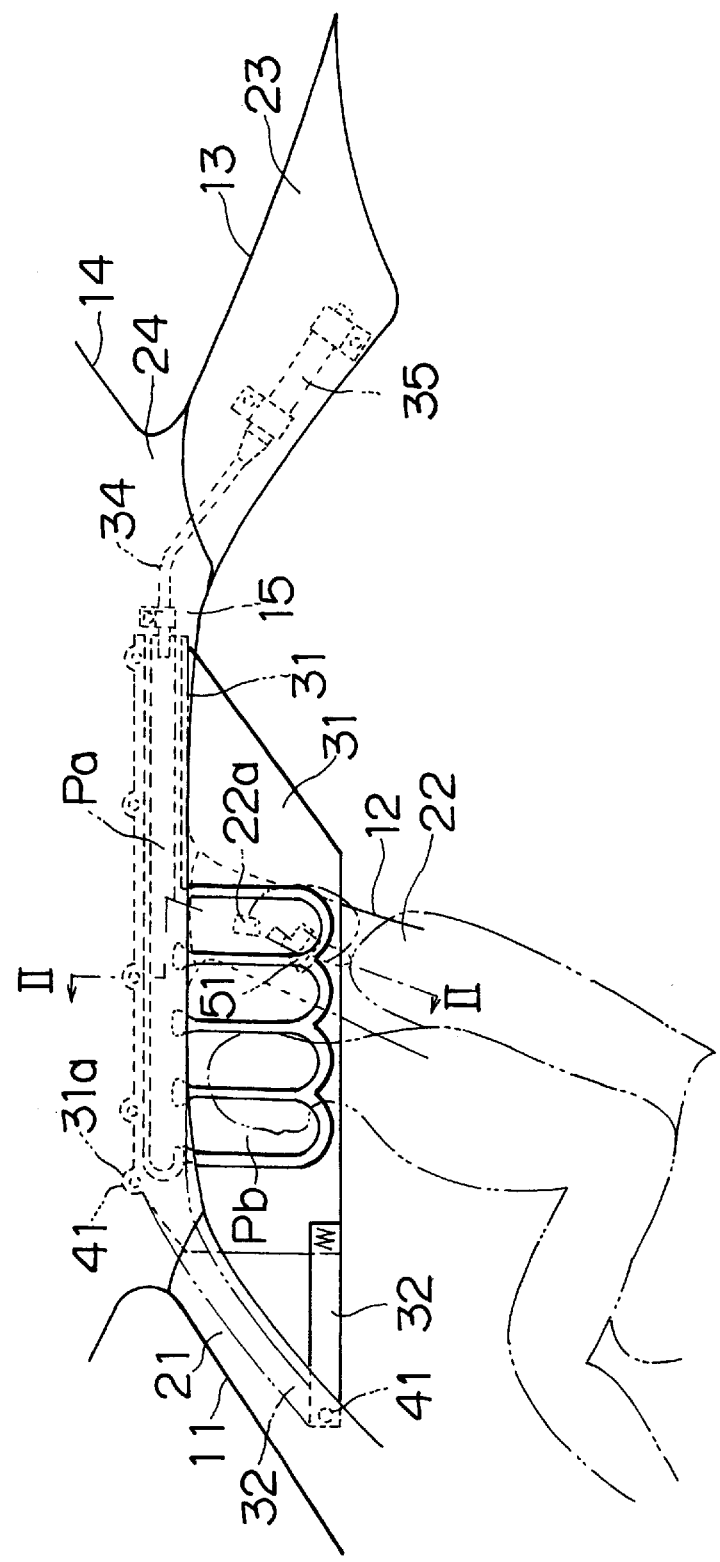
FIG. 1 is a diagram of a first embodiment of the invention as viewed from the inside of the vehicle compartment.
Figure 2:
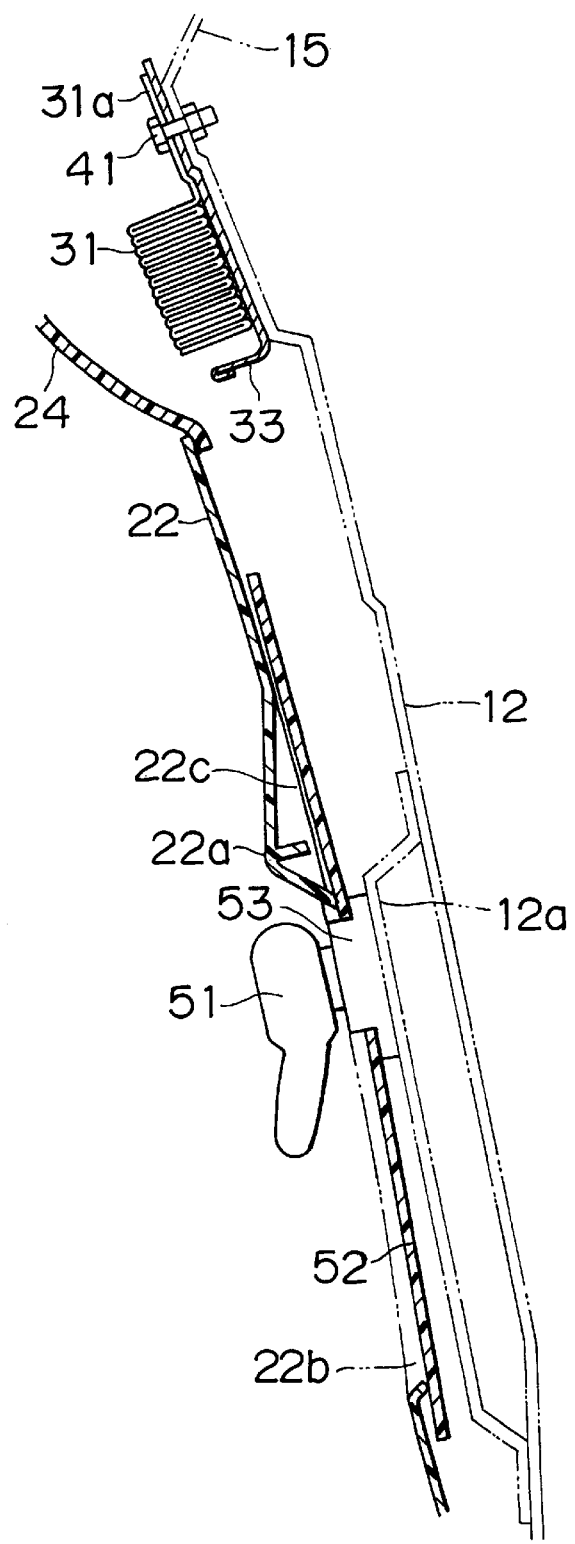
FIG. 2 is an enlarged cross-sectional view taken along the line II—II of FIG. 1 in the state where a head-protection air-bag body is stored.
Figure 3:
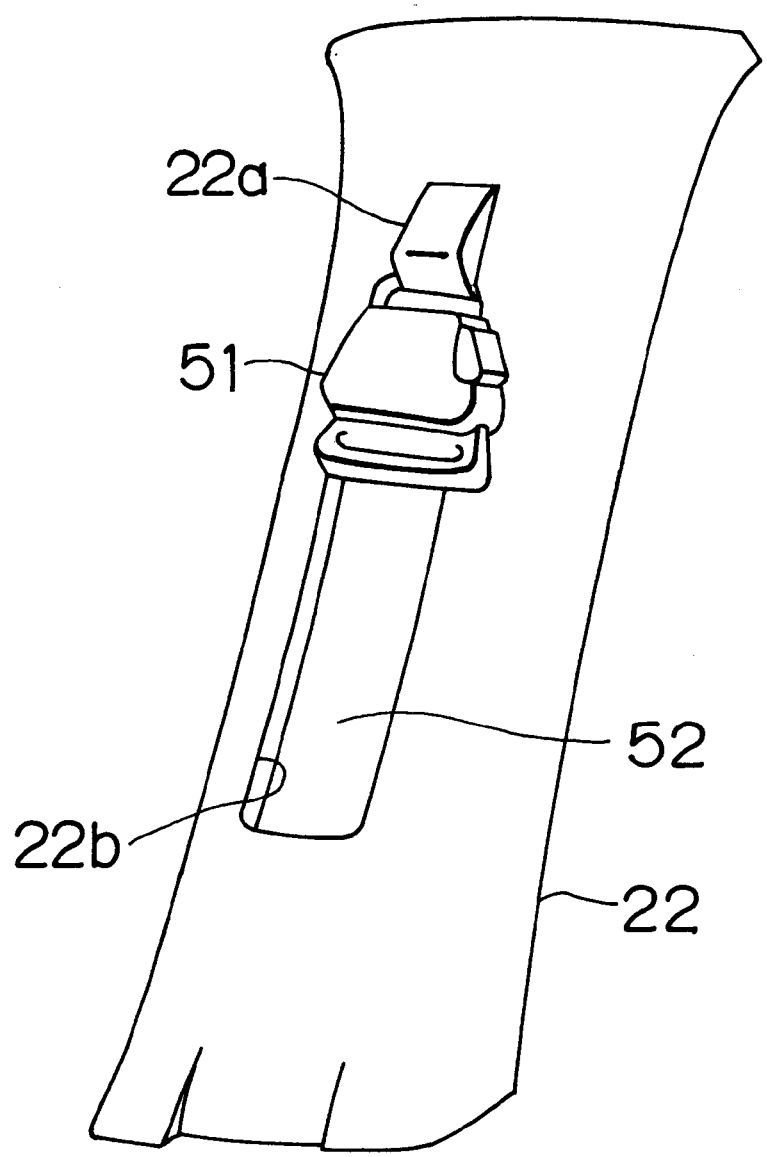
FIG. 3 is a center pillar in the first embodiment of the invention viewed from the inside of the vehicle compartment.

Hereinafter, embodiments of the invention will be described in conjunction with the drawings. FIGS. 1 to 3 show a first embodiment of the invention. As shown in FIG. 1, in the first embodiment, a front pillar 11 of the vehicle body is covered by a front-pillar garnish 21 from the inside of the vehicle compartment. A center pillar 12 is covered by a center-pillar garnish 22 from the inside of the vehicle compartment. A quarter pillar 13 is covered by a quarter-pillar garnish 23 from the inside of the vehicle compartment. A roof 14 and a roof side rail 15 are covered by a roof head lining 24 from the inside of the vehicle compartment.

In the inside of the vehicle compartment, a head-protection air-bag body 31 is stored in the folded state (more specifically, held with a tearable tape (not shown) at predetermined intervals) along the roof side rail 15 as shown in FIG. 2, and is covered by the peripheral portion of the roof head lining 24. As shown in FIG. 1, the head-protection air-bag body 31 is inflated and deployed like a curtain so as to cover the center pillar 12 (including the center-pillar garnish 22) from the inside of the vehicle compartment. A tension belt 32 sewed onto the front lower end of the head-protection air-bag body 31 is stored at the front pillar 11, and covered by the front-pillar garnish 21. The tip of the tension belt 32 is attached to the front pillar 11 by a fixing member 41.

As shown in FIG. 1, the head-protection air-bag body 31 is provided with a plurality of attachment pieces 31a along its upper edge so as to be attached to the roof side rail 15 by fixing members 41. Furthermore, as shown in FIG. 2, the head-protection air-bag body 31 is provided with an attachment pieces 31a at near the center pillar 12 so as to be attached to the roof side rail 15 together with an L-shaped plate 33 by fixing members 41. The L-shaped plate 33 prevents the head-protection air-bag body 31 in its deployment from becoming hooked at an upper end of the center-pillar garnish 22. The head-protection air-bag body 31 has a gas introducing path Pa extending in the upper portion of the air-bag body 31 in the longitudinal direction of the vehicle and having an opening at its rear end, and a plurality of vertically extending inflation chambers Pb communicating with the gas introducing path Pa at their respective upper ends.

An inflator 35 is connected to the rear-end opening of the gas introducing path Pa through a gas supply pipe 34, so that the gas injected from the inflator 35 flows into each inflation chamber Pb through the gas supply pipe 34 and the gas introducing path Pa. Thus, the head-protection air-bag body 31 is inflated and deployed by the gas flowing into each inflation chamber Pb. Note that the inflator 35 is attached to the quarter pillar 13 by a fixing member and is covered by the quarter-pillar garnish 23 so as to inject the gas upon side collision of the vehicle.

In the first embodiment, a slip joint 51 for supporting an intermediate portion of a seat belt (not shown) in a slidable manner is provided so as to project into the inside of the vehicle compartment from a vertically elongated opening 22b formed in the center-pillar garnish 22. The slip joint 51 is mounted to an adjustable anchor 53 together with a slide plate 52 (a covering plate mounted to the center-pillar garnish 22 from the outside of the vehicle compartment) so as to be supported in a swingable manner. Thus, when the adjustable anchor 53 moves in the vertical direction, the slip joint 51 together with the slide plate 52 move integrally therewith. The adjustable anchor 53 is mounted to a rail 12a provided at the center pillar 12 so as to be positionally adjustable in the vertical direction. Accordingly, the adjustable anchor 53 can be fixed at the position corresponding to the physique of the occupant.

As shown in FIGS. 1 to 3, in the first embodiment, a projecting portion 22a, which serves as a deployment-direction regulator, is provided in the center-pillar garnish 22 at a position above and adjacent to the slip joint 51. The projecting portion 22a, which is formed integral with the center-pillar garnish 22, has a predetermined width in the longitudinal direction of the vehicle, and is substantially triangular in vertical cross section. Thus, the projecting portion 22a serves to regulate (direct) the deployment direction of a corresponding portion of the head-protection air-bag body 31 (a portion that is inflated and deployed to cover the center pillar 12 including the center-pillar garnish 22 from the inside of the vehicle compartment) toward the inside of the vehicle compartment.

As a result, in the first embodiment, even if deployment is started in the state where the lower end of the corresponding portion that covers the center pillar 12 upon inflation and deployment of the head-protection air-bag body 31 is not sufficiently inflated, the projecting portion 22a of the center-pillar garnish 22 guides the lower end while regulating the deployment direction thereof toward the inside of the vehicle compartment. Accordingly, the lower end of the corresponding portion of the head-protection air-bag body 31 can be effectively prevented from being hooked at the slip joint 51. Moreover, the projecting portion 22a need only be added to the center-pillar garnish 22. Such a simple structure allows the invention to be embodied at low cost. As shown in FIG. 2, the projecting portion 22a is provided with a plurality of ribs 22c in an inner space. The ribs 22c form a grating structure and can absorb a predetermined amount of an energy that is occurred by the impact load in the direction from the inside of the vehicle compartment to the outside. The projecting portion 22a also can be formed as a solid portion. Urethane pad or the like, can be disposed in the inner space of the projecting portion 22a.

Figure 4:
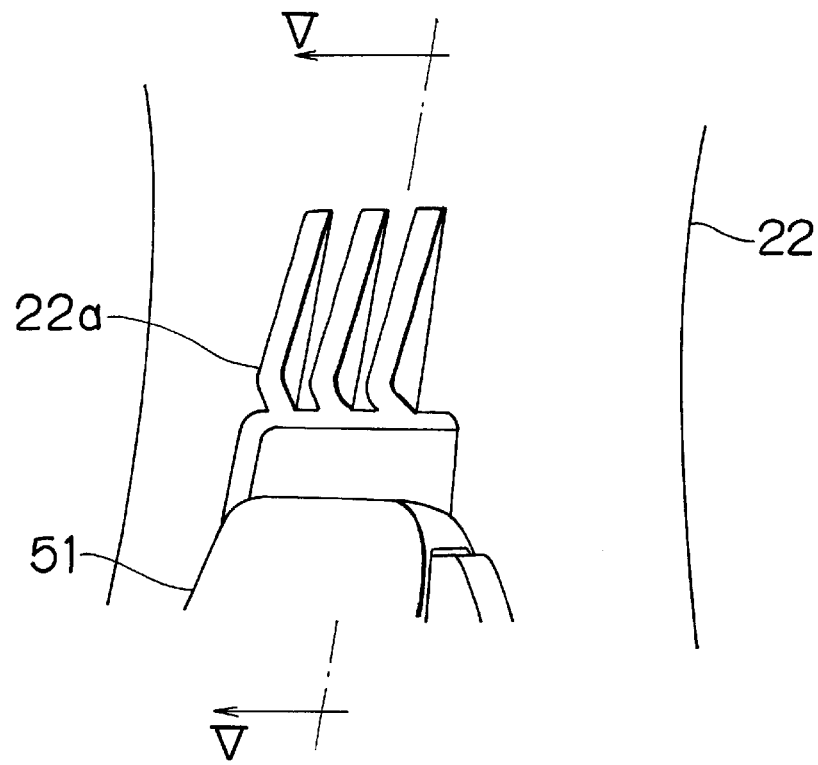
FIG. 4 is an enlarged view showing the main part of a first modification of the first embodiment shown in FIGS. 1 to 3.
Figure 5:
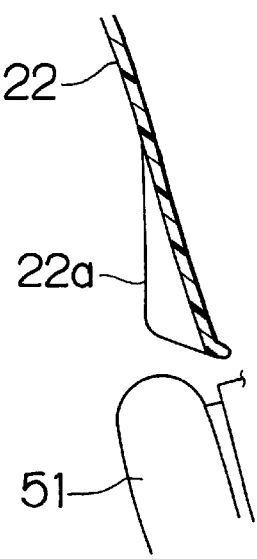
FIG. 5 is a cross-sectional view taken along the line V—V of FIG. 4.

In the above-described first embodiment, the projecting portion 22a (which has a predetermined width in the longitudinal direction of the vehicle and is substantially triangular in vertical cross section, as shown in FIGS. 1 to 3) formed integral with the center-pillar garnish 22 is used as a deployment-direction regulator provided at a position above and adjacent to an interior projection of the vehicle compartment such as the slip joint 51 at the center pillar 12, and regulates the deployment direction of the head-protection air-bag body 31 toward the inside of the vehicle compartment. For example, however, a projecting portion $22_a$ shown in FIGS. 4 and 5 or a projecting portion 22a shown in FIGS. 6 and 7 may alternatively be provided in the center-pillar garnish 22. The projecting portion 22a shown in FIGS. 4 and 5 is a rib-shaped portion formed integral with the center-pillar garnish 22. The projecting portion 22a shown in FIGS. 6 and 7 is a member separate from the center-pillar garnish 22 and integrally mounted thereto.

Figure 8:
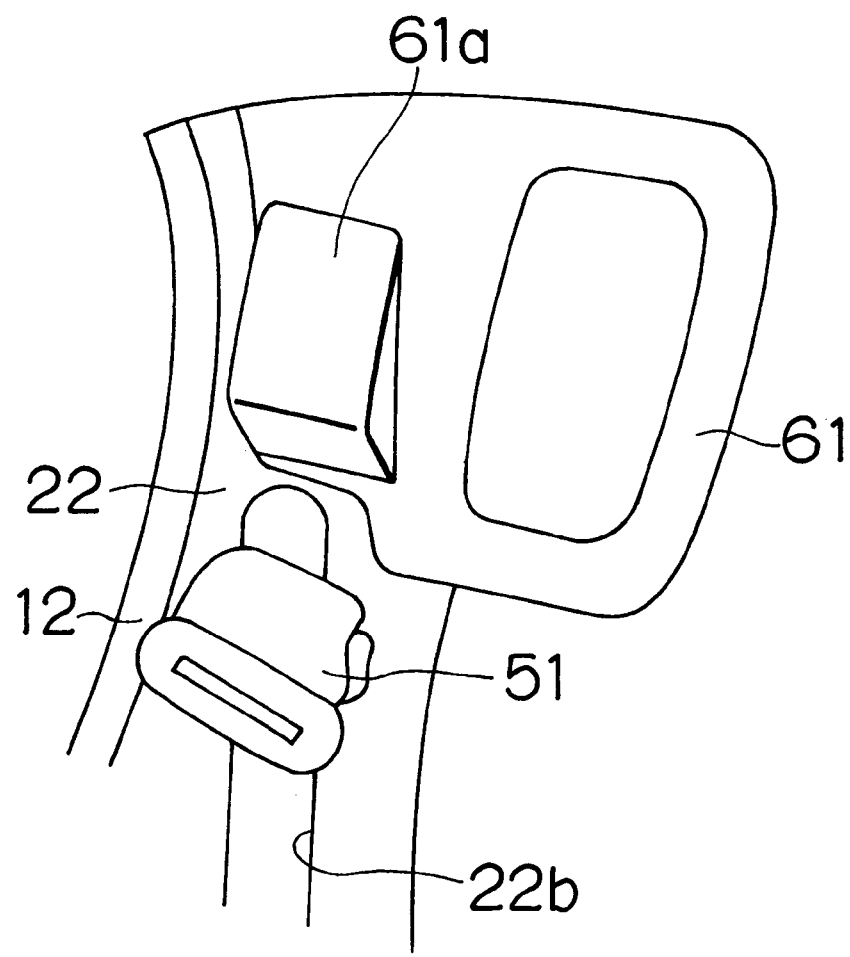
FIG. 8 is an enlarged view showing the main part of a third modification of the first embodiment showing in FIGS. 1 to 3.
Figure 9:
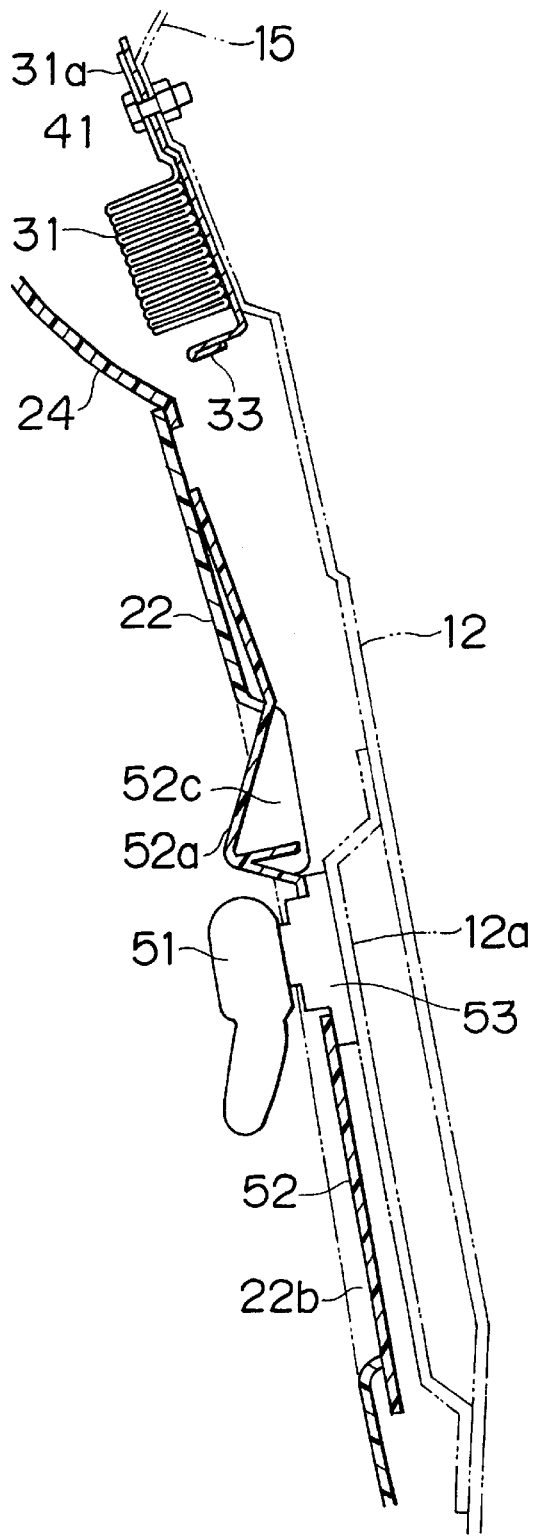
FIG. 9 is a cross-sectional view showing the main part of a fourth modification of the first embodiment shown in FIGS. 1 to 3.
Figure 10:
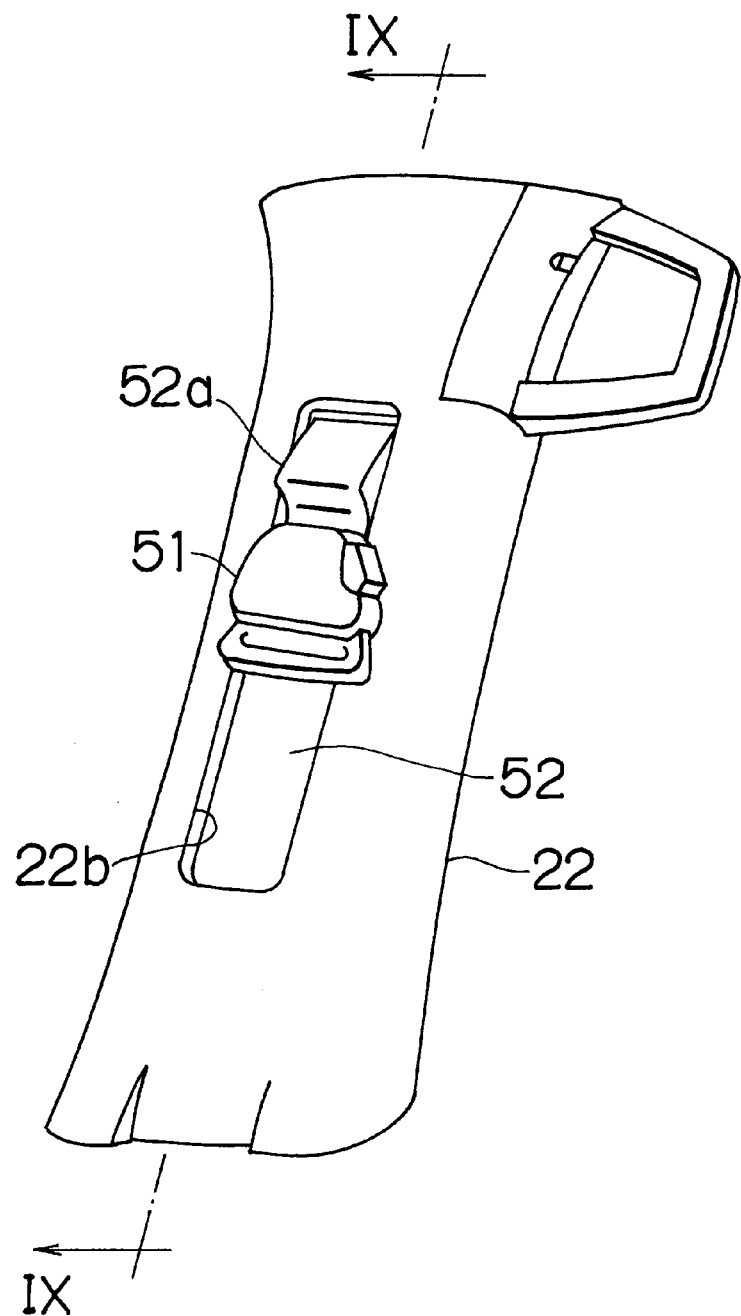
FIG. 10 is a center pillar in the fourth modification of the first viewed from the inside of the vehicle compartment.

In each of the above-mentioned embodiments, the projecting portion 22a, serving as the deployment-direction regulator, is provided to the center-pillar garnish 22. For example, however, as shown in FIG. 8, a projecting portion 61a, serving as the deployment-direction regulator, may alternatively be provided to a getting-on/off assist grip 61 that is fixedly attached to the upper end of the center pillar 12 together with the center-pillar garnish 22. Alternatively, as shown in FIGS. 9 and 10, a projecting portion 52a, serving as the deployment-direction regulator, may be provided to the slide plate 52 that is integrally mounted to the adjustable anchor 53 so as to move integrally with the slip joint 51 when adjusting the vertical position of the adjustable anchor 53. A plurality of ribs 52c that form a grating structure are disposed in the inner space of the projecting portion 52a so as to absorb an energy that is occurred by the impact load in the direction from the inside of the vehicle compartment to the outside.

In each of the embodiments shown in FIGS. 4 to 8, the same effects obtained by the first embodiment shown in FIGS. 1 to 3 can be obtained. Moreover, in the embodiment of FIGS. 9 and 10, even when the slip joint 51 is vertically adjusted in position together with the adjustable anchor 53, the slide plate 52 is moved together therewith, so that the slip joint 51 and the projecting portion 52a are always kept in a fixed positional relation. Therefore, in the FIG. 6 embodiment, the lower end of the corresponding portion of the head-protection air-bag body 31 can always be stably prevented from being hooked at the slip joint 51.

Figure 6:
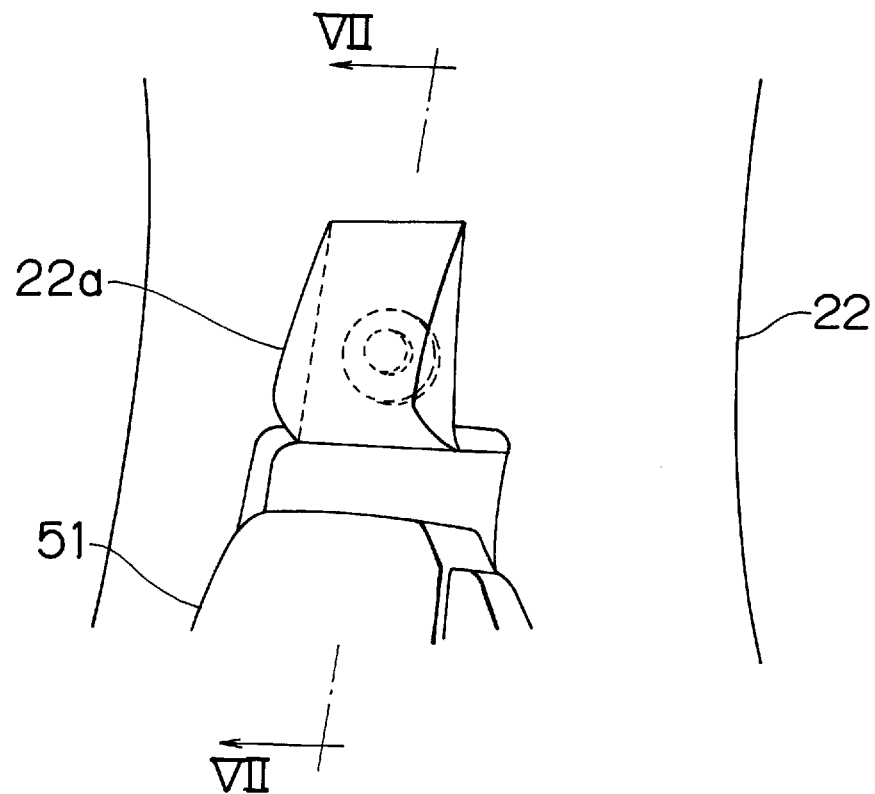
FIG. 6 is an enlarged view showing the main part of a second modification of the first embodiment showing in FIGS. 1 to 3.
Figure 7:
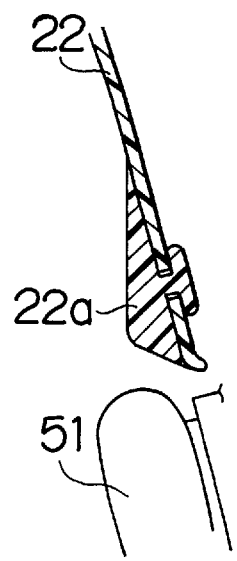
FIG. 7 is a cross-sectional view taken along the line VII—VII in FIG. 6.

Note that, in the embodiments shown in FIGS. 8 to 10 as well, the projecting portion 61a, 52a may be formed as a rib-shaped portion as shown in FIGS. 4 and 5 or as a separate member as shown in FIGS. 6 and 7.

Also, note that, in the embodiments shown in FIGS. 1 to 10, a shape of the projecting portion is not limited in substantially triangular in vertical cross section. The projecting portion can be formed to have a surface that extends from a surface of the center-pillar garnish 22 toward an upper portion of the surface of the slip joint 51, the surface faces an inside of the vehicle compartment. Ultimately, the projecting portion can be a various shapes to regulate a deployment direction of the head-protection air-bag body 31 toward an inside of the vehicle compartment otherwise.

Figure 11:
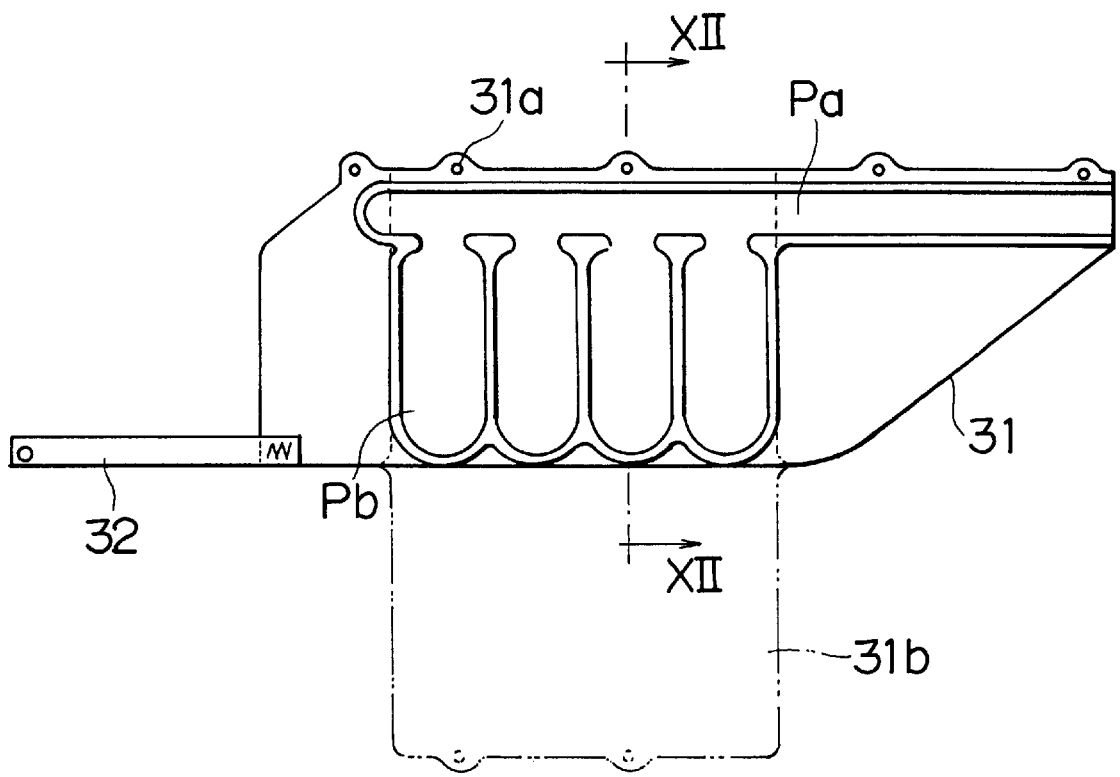
FIG. 11 is a diagram of a second embodiment of the invention as viewed from the inside of the vehicle compartment.
Figure 12:
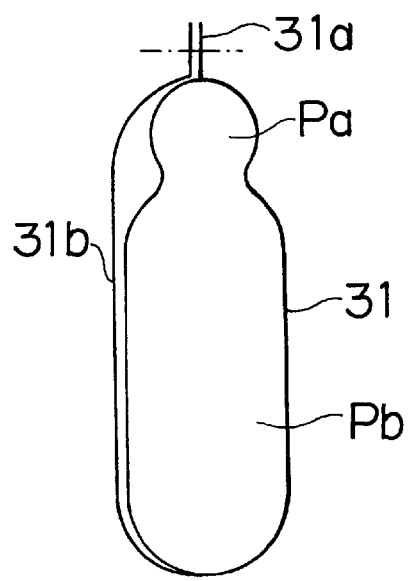
FIG. 12 is an enlarged cross-sectional view taken along the line XII—XII of FIG. 11.

FIGS. 11 and 12 show a second embodiment of the invention. In the second embodiment, a non-inflatable extended portion 31b is provided integral with the end of the corresponding portion (the portion that is inflated and deployed to cover the center pillar 12) of the head-protection air-bag body 31. The extended portion 31b is folded back upward toward the outside of the vehicle compartment and fixed to the roof side rail 15 together with the attachment piece(s) 31*a* by the fixing member(s) 41. Thus, the head-protection air-bag body 31 has such a non-projecting shape that the lower end of the corresponding portion does not project downward from the inflation chambers. The structure is otherwise the same as that of the first embodiment shown in FIGS. 1 to 3.

Therefore, in the second embodiment, even if deployment is started in the state where the lower end of the corresponding portion that covers the center pillar 12 upon inflation and deployment of the head-protection air-bag body 31 is not sufficiently inflated, the lower end of the corresponding portion is not likely to be hooked at an interior projection of the vehicle compartment such as slip joint 51 due to the non-projecting shape. Accordingly, the lower end of the corresponding portion of the head-protection air-bag body 31 can be effectively prevented from being hooked at an interior projection of the vehicle compartment such as slip joint 51.

Moreover, in the second embodiment, the non-inflatable extended portion 31*b* of the head-protection air-bag body 31 is folded back upward toward the outside of the vehicle compartment and fixed to the roof side rail 15 in order to form the above-mentioned non-projecting shape. Therefore, the non-inflatable extended portion 31*b* can protectively cover and reinforce the corresponding portion (in which the inflation chambers Pb are formed) of the head-protection air-bag body 31 from the outside of the vehicle compartment, whereby the corresponding portion can be effectively prevented from being damaged from the outside of the vehicle compartment (e.g., damage caused by broken window glass).

Figure 13:
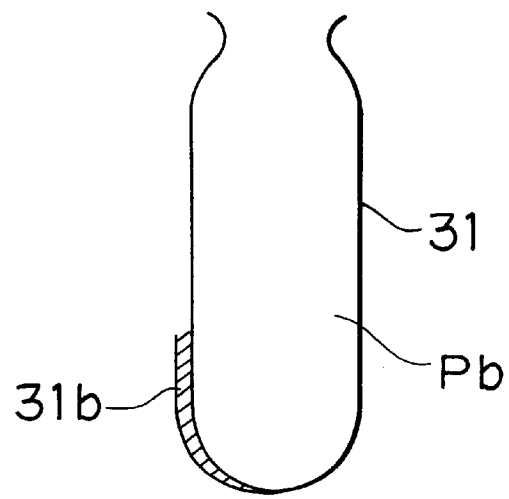
FIG. 13 is a cross-sectional view showing the main part of a first modification of the second embodiment shown in FIGS. 11 and 12.

In the above-described second embodiment, the non-inflatable extended portion 31*b* extending up to the attachment piece(s) 31*a* toward the outside of the vehicle compartment is provided so that the head-protection air-bag body 31 has a non-projecting shape, i.e., so that the lower end of the corresponding portion of the air-bag body 31 does not project downward from the inflation chambers. For example, however, as shown in FIG. 13, the non-inflatable extended portion 31*b* provided at the end of the corresponding portion of the head-protection air-bag body 31 may alternatively be folded back by a predetermined amount upward toward the outside of the vehicle compartment and bonded to the head-protection air-bag body 31 in order to form the above-mentioned non-projecting shape. In this embodiment, the same effects obtained by the second embodiment can be obtained.

Figure 14:
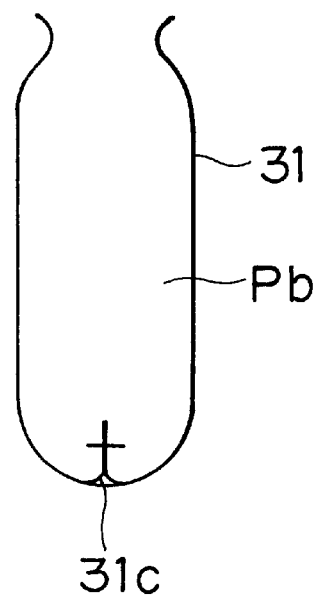
FIG. 14 is a cross-sectional view showing the main part of a second modification of the second embodiment shown in FIGS. 11 and 12.

Alternatively, as shown in FIG. 14, an end 31*c* of the corresponding portion of the head-protection air-bag body 31 may be folded into the inflation chambers Pb so as to project thereinto (the folded portion is sewed or bonded together) in order to form the above-mentioned non-projecting shape. In this embodiment, the lower end of the corresponding portion of the head-protection air-bag body 31 does not project downward from the inflation chambers. Due to this non-projecting shape, the lower end of the corresponding portion is not likely to be hooked at an interior projection of the vehicle compartment such as slip joint 51. Therefore, the lower end of the corresponding portion of the head-protection air-bag body 31 can be effectively prevented from being hooked at an interior projection of the vehicle compartment such as slip joint 51.

Figure 15:
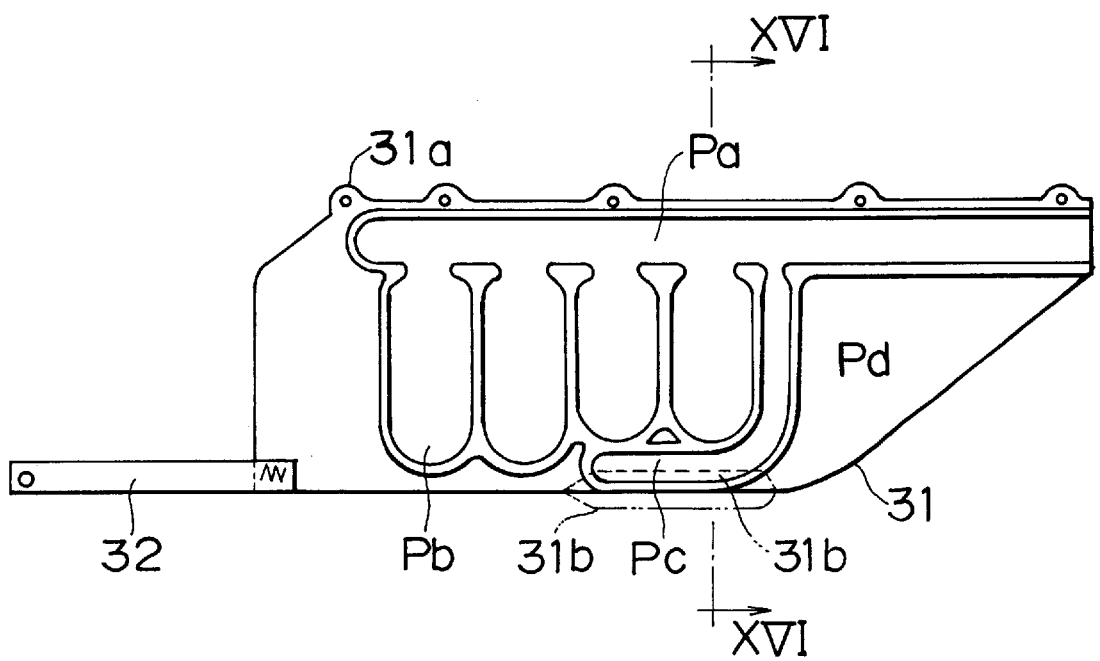
FIG. 15 is a diagram of a third embodiment of the invention as viewed from the inside of the vehicle compartment.
Figure 16:
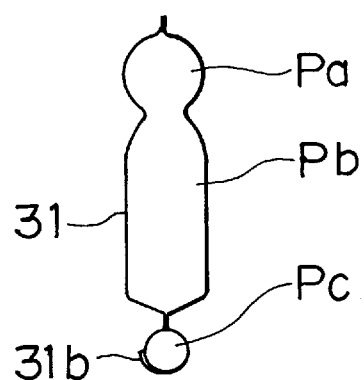
FIG. 16 is a cross-sectional view taken along the line XVI—XVI of FIG. 15.

FIGS. 15 and 16 show a third embodiment of the invention. In the third embodiment, a longitudinal inflation chamber Pc that is inflated in the early stage of inflation and deployment is provided in the lower end of the corresponding portion of the head-protection air-bag body 31 that is inflated and deployed to cover the center pillar 12. The longitudinal inflation chamber Pc has a volume smaller than that of each of the vertical inflation chambers Pb. Moreover, the longitudinal inflation chamber Pc communicates with the gas introducing path Pa through a communication path Pd at a position rearward of the inflation chambers Pb so as to be inflated and deployed into a predetermined shape earlier than the inflation chambers Pb. In the third embodiment as well, the non-inflatable extended portion 31*b* provided at the end of the corresponding portion of the head-protection air-bag body 31 is folded back by a predetermined amount upward toward the outside of the vehicle, and bonded to the head-protection air-bag body 31. The structure is otherwise the same as that of the first embodiment shown in FIGS. 1 to 3.

Thus, in the third embodiment, even if deployment is started in the state where the lower end of the corresponding portion that covers the center pillar 12 upon inflation and deployment of the head-protection air-bag body 31 is not sufficiently inflated, the longitudinal inflation chamber Pc is accurately inflated in the early stage of the inflation and deployment. As a result, the lower end of the corresponding portion of the head-protection air-bag body 31 is not likely to be hooked at an interior projection of the vehicle compartment such as slip joint 51. Therefore, the lower end of the corresponding portion of the head-protection air-bag body 31 can be effectively prevented from being hooked at an interior projection of the vehicle compartment such as slip joint 51.

As indicated above, the second and third embodiments can be used together. The second and third embodiments also can be used individually. The first embodiment can be used individually or in combination with one or both of the second and third embodiments.

In each of the foregoing embodiments (the embodiments shown in FIGS. 1 to 16), the invention is embodied as a head-protection air-bag device for supplying a gas from the rear of the head-protection air-bag body 31. However, the invention may also be embodied as a head-protection air-bag device for supplying a gas from the front of the head-protection air-bag body 31 (e.g., the device shown in Japanese Laid-Open Publication No. 11-91489). More specifically, in each of the foregoing embodiments, the inflator 35 is provided at the quarter pillar 13. For example, however, the inflator 35 may alternatively be provided at the joint portion between the front pillar and the instrument panel, or at the center pillar or the roof side rail. Alternatively, the inflator 35 may be provided at any two or all of the above-mentioned positions.

Figure 17:
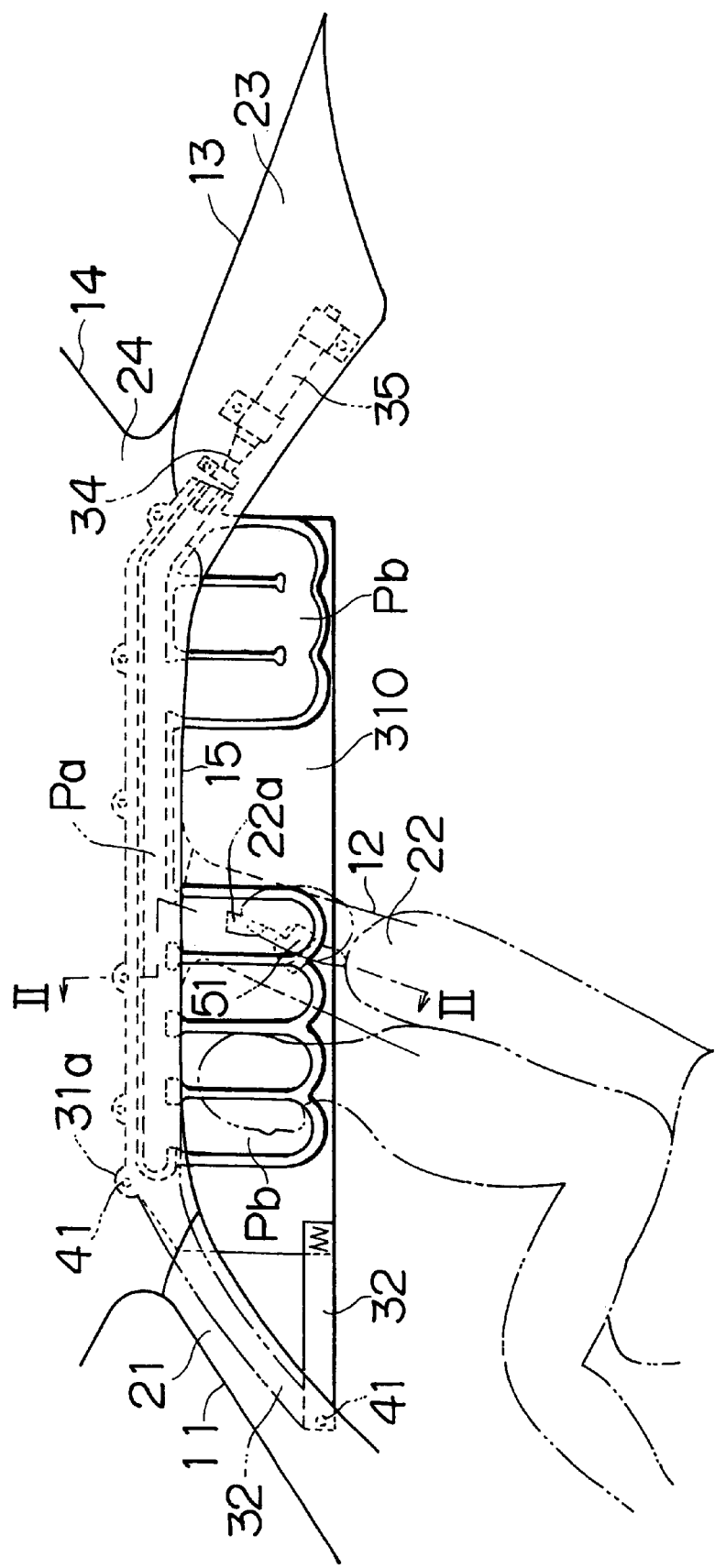
FIG. 17 is a diagram of a modification of the first to third embodiments shown in FIGS. 1 to 16.

The head-protection air-bag device of the invention is not limited to the shape of the air-bag body 31 as shown in FIG. 1. The invention may also be applied to a head-protection air-bag device using an air-bag body 310 having such a shape that protects the heads of the occupants in the front and rear seats as shown in FIG. 17, and a head-protection air-bag device using an air-bag body having another shape.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A head-protection air-bag device in combination with an edge of a door opening that includes a roof side rail and a center pillar having an interior projection that projects into a vehicle compartment, comprising:

a head-protection air-bag body mountable in a folded state along the roof side rail, and deployable in the form of a curtain so as to cover at least the center pillar from an inside of the vehicle compartment; and a deployment-direction regulator, provided on the center pillar at a position above and adjacent to the interior projection, to regulate a deployment direction of the air-bag body toward an inside of the vehicle compartment.

2. The head-protection air-bag device according to claim 1, wherein the interior projection includes an inner surface that faces an inside of the vehicle compartment, and wherein the deployment-direction regulator has a surface that extends from a surface of the center pillar toward an upper portion of the inner surface.

3. The head-protection air-bag device according to claim 1, wherein the deployment-direction regulator is a projection provided integral with a pillar garnish of the center pillar and is substantially triangular in vertical cross section.

4. The head-protection air-bag device according to claim 1, wherein the deployment-direction regulator includes at least one rib that is substantially triangular in vertical cross section.

5. The head-protection air-bag device according to claim 1, wherein the deployment-direction regulator is a member separate from a pillar garnish of the center pillar, and is fixed to the pillar garnish.

6. The head-protection air-bag device according to claim 1, wherein the deployment-direction regulator is a projection provided integral with an assist grip and is substantially triangular in vertical cross section, the assist grip being fixedly attached to an upper portion of the center pillar.

7. The head-protection air-bag device according to claim 1, wherein the deployment-direction regulator is a projection provided integral with a slide plate and is substantially triangular in vertical cross section, the slide plate being mounted to an adjustable anchor that is vertically adjustable in position on the center pillar while supporting a slip joint.

8. The head-protection air-bag device according to claim 7, wherein the deployment-direction regulator includes at least one rib that is substantially triangular in vertical cross section.

9. The head-protection air-bag device according to claim 1, wherein the deployment-direction regulator is a projection separate from the slide plate, and is fixed to the slide plate, and the projection is substantially triangular in vertical cross section, the slide plate being mounted to an adjustable anchor that is vertically adjustable in position on the center pillar while supporting a slip joint.

10. The head-protection air-bag device according to claim 1, wherein the deployment-direction regulator is provided with a plurality of ribs that form a grating structure and absorb an energy, in an inner space of the deployment-direction regulator.

* * * * *